United States Patent
Breeze et al.

[15] 3,653,044
[45] Mar. 28, 1972

[54] DISPLAY SYSTEM FOR PROVIDING RADAR PLAN POSITION INFORMATION ON A RASTER DISPLAY

[72] Inventors: Eric G. Breeze, Los Altos; John O. Sabel, Sunnyvale, both of Calif.

[73] Assignee: Kaiser Aerospace & Electronics Corporation, Oakland, Calif.

[22] Filed: Sept. 22, 1969

[21] Appl. No.: 859,809

[52] U.S. Cl.............................................343/5 SC, 343/5 DP
[51] Int. Cl..............................................G01s 7/10
[58] Field of Search..............................343/5 R, 5 DP, 5 SC

[56] References Cited

UNITED STATES PATENTS 3,230,530   1/1966   Balding................................343/5 SC Primary Examiner—T. H. Tubbesing
Attorney—Johnson, Dienner, Emrich, Verbeck & Wagner

[57] ABSTRACT

A display system for use in the presentation of radar plan information on the same display device used for television camera video and radar profile presentation. Radar video provided by a conventional radar set is gated into temporary storage registers for selective gating to a storage matrix made up of multibin registers, each of which registers stores the radar information detected along a given azimuth, the different bins of each register storing the information for different ranges along the azimuth represented by the register. Readout from the storage matrix is by a nonlinear vertical clock train which provides higher resolution for closer ranges and horizontal pulses of different widths for different vertical raster positions which result in radial sectors which become progressively narrower at the bottom of the display to further increase resolution for closer ranges. The radar plan information is converted to a raster format to permit the display thereof on the same cathode ray tube with other information required in aircraft presentations.

29 Claims, 9 Drawing Figures

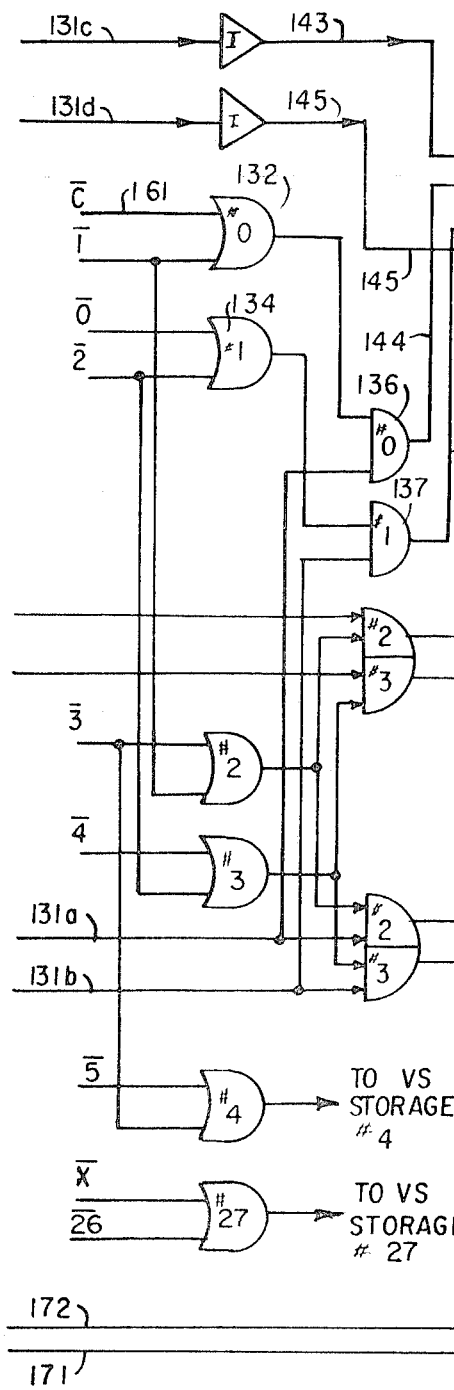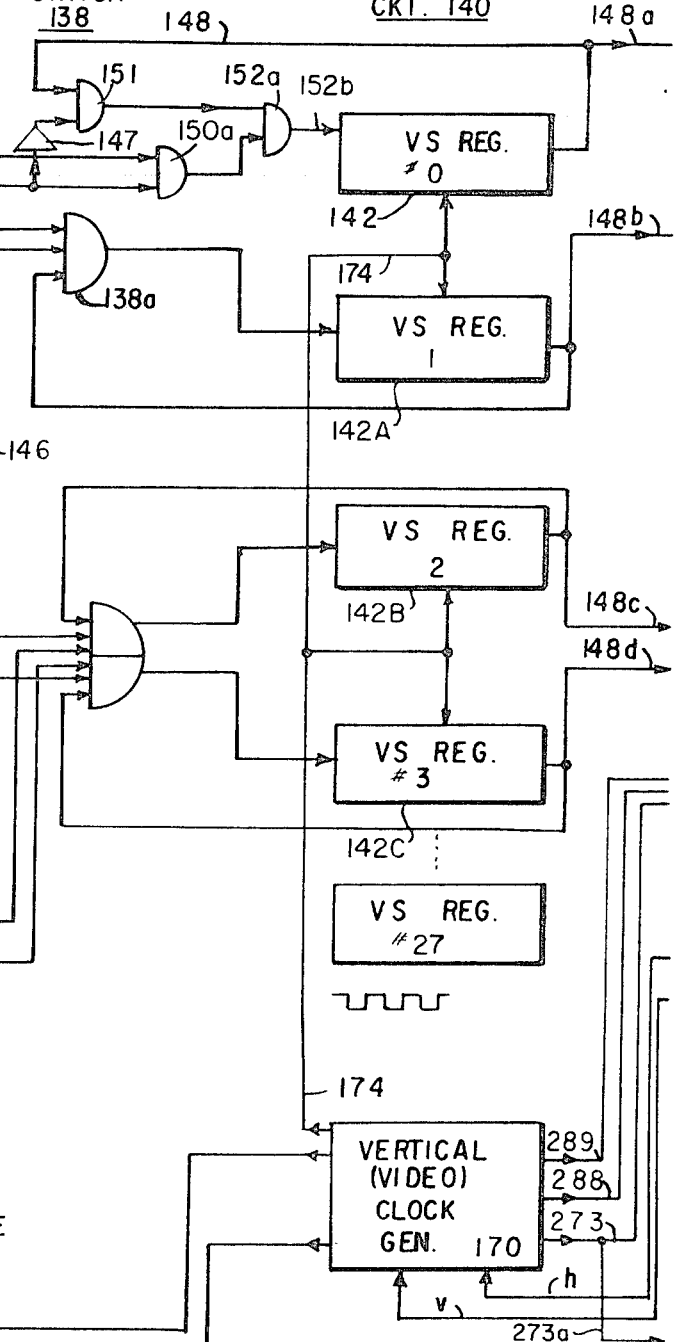
FIG.3

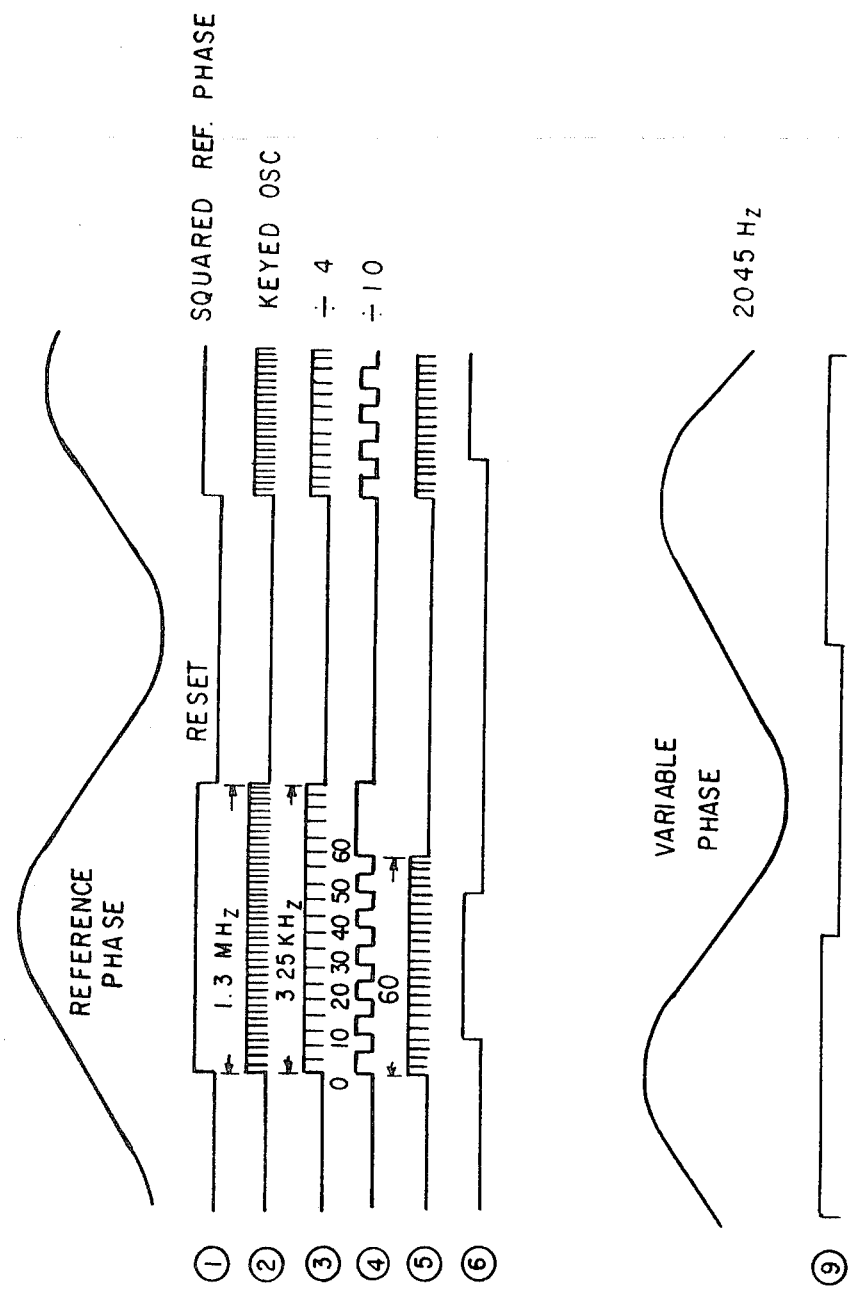

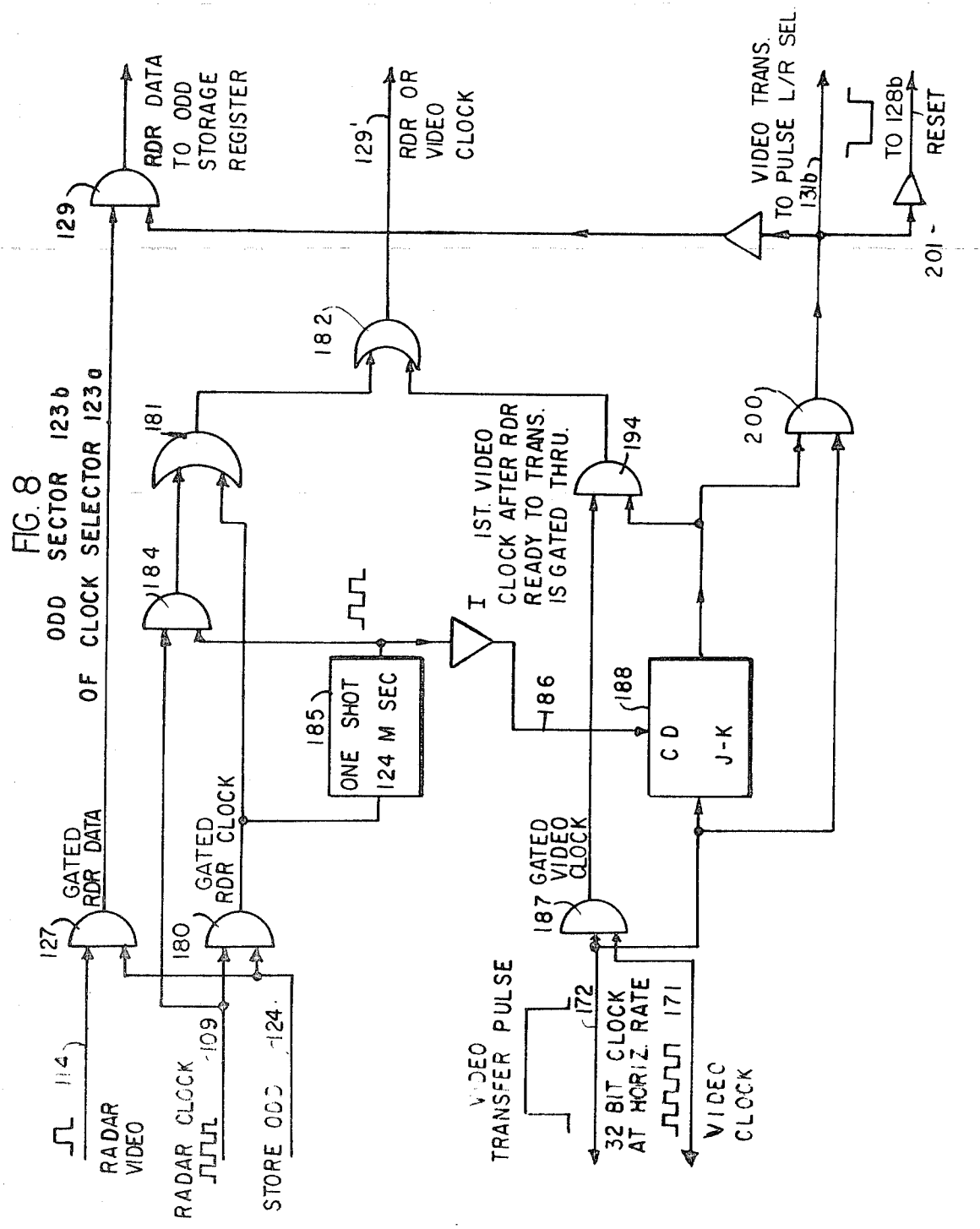

DISPLAY SYSTEM FOR PROVIDING RADAR PLAN POSITION INFORMATION ON A RASTER DISPLAY

BACKGROUND OF THE INVENTION

1. Field of the Invention

The present invention relates to a display system for providing radar plan (range vs. azimuth) in a format which may be presented on a conventional cathode ray tube with radar profile (elevation vs. azimuth) and television camera video information.

2. Description of Prior Art

Previous systems which presented radar plan position information used line writing techniques wherein the presentation on the cathode ray tube was related to and dependent upon the position of the radar antenna. As the antenna is rotated in a scan of different azimuth bearings, the information detected in each bearing is fed to the system for display on the cathode ray tube. Since the antenna moves at such a slow rate, it is necessary to use a tube having fairly high persistence phosphor and a slow decay rate so that the relative positions of the target detected in the earlier portion of the sweep are still visible as the radar reaches the latter portions of the sweep. While the use of a long persistent phosphor does provide display of targets detected in one sector for simultaneous viewing with targets detected in other latter sectors, the use of such phosphor introduces certain other problems. In the use of such displays with high speed aircraft, for example, if the aircraft makes a sudden turn the retention of the information detected in the scan on the previous aircraft heading conflicts with the information detected and presented for the new aircraft heading.

Of even greater significance, the presentation of different types of information on the same display is seriously limited by such mode of signal presentation. That is, in addition to the phosphor persistence problems, only a limited amount of symbology can be presented on a display which uses the line writing techniques and the amount of symbology which can be presented in such type system frequently does not approach the amount desired or required in aircraft display work. Further, such type of display does not permit the presentation of other forms of information, as for example, television sensor or video information on the same cathode ray tube, which require short persistance phosphor having a medium fast decay rate.

In modern aircraft the amount of information required by the pilot in control of the aircraft is continually increasing, and the available space for data presentation is at a premium. The use of one large area, such as required by the face of a cathode ray tube on the instrument panel, to provide only one set of information (such as radar plan information) is extremely wasteful of valuable space, and requires that some solution be provided which permits a more efficient presentation of such information.

SUMMARY OF INVENTION

It is an object of the present invention therefore to provide a novel display system which presents radar information on a cathode ray tube display in a mode which permits the presentation of data obtained with a television camera and random profile information obtained with radar equipment on the same cathode ray tube, which allows for use of a short persistence phosphor.

In the radar plan mode presentation, terrain which is higher than a preselected reference plane is presented in a sector presentation. The viewing angle for the system is depressed approximately 8° from boresight and the display is a sector scan of approximately 45° on either side of the ground track line. Any terrain higher than the reference plane will result in the presentation of an identification symbol at the appropriate point in bearing and range on the display. A ground track line and a horizontal reference line are separately generated markers which are mixed with the television presentation of the radar plan mode. Range markers at 3, 6, 10 miles are provided to assist in identification of the range to the targets shown on the display. A feature of the invention is the manner in which such information as detected by an antenna scan of a conventional radar set is provided on the raster of a conventional television monitor, whereby the same television monitor may be used in the presentation of other information including television camera video signals, terrain profile information, and others.

It is a specific object of the present invention to provide a novel electronic circuit arrangement which accepts the signal input from a radar antenna which operates through a scan of approximately 180° at a frequency of approximately one and one half seconds, and which transmits main bang synchronization signals at a frequency of approximately 1,236 microseconds, and which processes such signals for presentation on a television raster which has a horizontal trace rate of 15.75 kiloHertz and a 60 Hertz vertical rate.

It is a further object of the invention to provide a sector presentation of radar information detected in a sector scan on the raster of a cathode ray tube, and to provide a nonlinear presentation of such information, wherein the information at closer range is displayed at higher resolution than the information at more distant ranges.

It is yet another object of the invention to provide a radar scan presentation in a sector pattern on a vertical raster display which includes nonlinear clock means for providing vertical perspective to the sector display, and horizontal gating means operated for different time intervals at different vertical positions on the raster to provide perspective in the horizontal dimension.

It is yet another object of the invention to describe a system and the method for converting radar information from a given frequency or main bang synchronization rate and the 3 second antenna sweep rate to the standard 15.75 KiloHertz horizontal and 60 Hertz vertical television frequencies without loss or misrepresentation of the initial radar information.

BRIEF DESCRIPTION OF DRAWINGS

With reference to the drawings,

FIGS. 2-5 illustrate the circuitry of the novel terrain plan generator;

FIG. 7 is a time diagram showing the relation of the output signals in the various stages of the counter of FIG. 6;

FIG. 8 is a circuit diagram of the odd sector of the clock selector shown in block in FIG. 2; and FIG. 9 is a circuit diagram of the vertical clock generator shown in block in FIG. 3.

GENERAL DESCRIPTION

The present disclosure is directed to a display system which processes radar range and azimuth data obtained from a conventional radar set for display on a standard television raster format. Radar plan position indicator (PPI) as now known in the art is the display on a cathode ray tube of terrain which protrudes through a preselected clearance plane. In one type of aircraft currently used in the field, for example, a clearance plane of 800 feet below the aircraft is normally selected for reference purposes. With such selection, any terrain higher than the reference plane will result in the presentation of such terrain at the appropriate point on the display which relates to the bearing and range of such terrain relative to the aircraft. When operating in such mode (radar plan) the radar may provide a sector scan of ± 42° on either side of the ground track line and at a viewing angle which is depressed downwardly approximately 8° from boresight. A ground track line and range markers (i.e., 3, 6, 10 miles, for example) may be separately generated and displayed with the terrain display to provide a more complete picture to the pilot.

DISPLAY FORMAT

Figure 1:
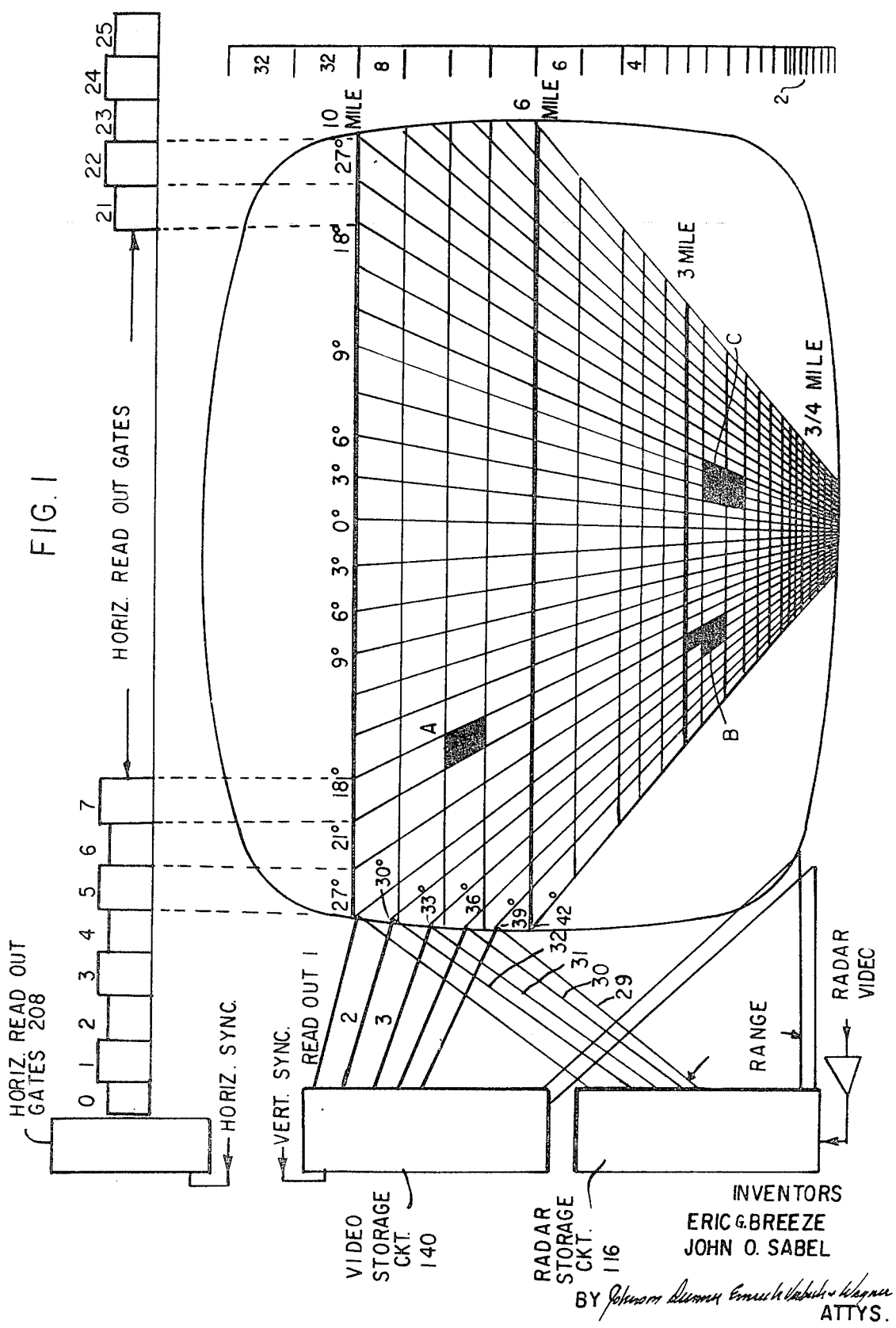
FIG. 1 is a representative showing of a display which is provided on the cathode ray tube for a set of assumed targets.

With reference to FIG. 1, the display provided in the present system may be generally described as comprising a grid or matrix format, the location of the information on the matrix being related to the position of storage of such information in the video storage equipment, which in turn is related to the actual range and azimuth of information which is transmitted into storage by the radar equipment. Briefly stated, the matrix may be represented by 28 radial (also referred to as vertical) lines and 32 lateral lines. Each sector defined by the pair of radial lines on the matrix represents a relative bearing in the real world, and each area between each two horizontal lines of the matrix represents a given range in the real world. In the present system (28 radial lines) the sector display provides scan information for ± 42°. The heavily shaded areas, such as areas A, B, C represent terrain which has been detected by the radar which is above the selected 800 foot reference plane.

As noted above, the ground track line (zero azimuth) and the 3, 6, and 10 mile range lines are actually presented on the display as reference markers which assist the pilot in locating the relative positioning of the detected terrain, and such lines are generated as lines of increased thickness.

Azimuth markers (0°, 3°, etc.,) may be provided to indicate the relative bearing to the displayed targets by locating permanent radial markings on the face of the cathode ray tube. Alternatively, since the actual locations of the azimuth lines are known to electronic circuitry (as will become apparent hereinafter), radial markers may be electronically generated on the display.

In the display of FIG. 1, the pilot is informed that the terrain which exceeds the established clearance level of 800 feet at point A bears approximately 18°-20° from his ground track line and is located at a distance of approximately 7 miles. It is apparent from the foregoing description that the basic display of the system embodiment to be described herein provides a clear representation to the pilot of the terrain above a given reference plane in an approximate 84° sector forward of the aircraft (42° on either side of the zero reference line) which ranges out to 10 miles in the present system which uses an AN/ASQ-38 radar set. In the use thereof with systems which have greater compatibilities the system components would be increased to accommodate display of the increased information.

DATA CONVERTER AND PROCESSING CIRCUITS

The equipment which is used to gate the radar video information from the radar equipment to the novel converter of the present system, and the novel circuitry which is used to process the received radar signals for the purpose of presenting a display in the format shown on the illustration are now set forth. Such equipment which may be used with a conventional radar system such as an AN/ASQ-38 radar set which is operative through an antenna scan of 180° in 1.5 seconds. Clocking means selectively divide the signal information provided by the radar into bit form for gating to a radar or scan converter storage circuit. The information placed in the scan converter storage circuit is clocked out (at a different rate than the radar signal input rate) into a video storage using an antenna scan data transfer equipment, and thereafter the information in the video storage is gated out at a television rate into a video mixer for application to a video monitor. A novel feature of the present invention is the manner in which the radar information is derived in an antenna scan of 3 cycles/second and in which the information is provided at the radar rate of approximately 810 cycles (1,236 microseconds between radar main bangs) is stored and converted for presentation on a television raster which has a 15.75 kc. horizontal rate and 60 cycle vertical rate.

DETAILED DESCRIPTION

SIGNAL INPUT STAGE

With reference to FIGS. 2, 3, 4, 5, as assembled, the system is shown thereat to include an antenna position indicator signal over path AS to the antenna position indicator circuitry (FIG. 5) to be described, and a signal input stage 101 having conductors 102 (radar main bang) and 103 (radar video) connected to the signal outputs of the radar equipment 100, which in the present embodiment is assumed to be an AN/ASQ-38 radar set which operates to provide a "main bang" pulse output for the antenna ANT at periodic intervals (1,236 microseconds interval in one well known set) and which detects radar return signals which result from reflection of the pulses from a target in the path of the radar antenna transmission. In such systems, the time of receipt of the return video signal is referenced to the time of the main bang to determine the range from the radar location to the target. The bearing of the target is determined by the position of the radar antenna at the time of transmission of the radar signal. For purposes of the present illustration, it is assumed that the antenna ANT in the radar set is rotated from left to right through a sector of 180° in 1.5 seconds, and then returns from right to left in the same time, whereby the antenna cycle requires approximately 3 seconds.

As shown, the main bang of the radar set which is transmitted over the antenna ANT is also fed over conductor 102 in the signal input stage 101 to a delay circuit 104 which after a delay equivalent to the normal dead time of the radar receiver which in the installation described was in the order of 9.3 microseconds, provides a start signal over conductor 105 to a 32 bit clock 106 which responsively generates 32 bit non-linear pulse train during the next 114.7 microsecond (124–9.3=114.7) time period (i.e., the time required for the radar wave to propagate from the ¾ mile range to a range of 10 miles and return). It should be noted that the travel rate of the radar energizing pulse and return (if any) is approximately 12.36 microseconds per nautical mile and that the radar information is gathered in this time period. Although radar main bang signal pulses are transmitted every 12.36 microseconds data is gathered in only one-tenth of this period. The clock 106 generates a nonlinear train of 32 pulses at the radar clock rate and may be similar in circuitry to the vertical clock generator 170 (FIG. 3) to be described.

As will be shown, the 32 bit pulses output from the clock 106 over conductor 108 to flip-flop 110 (and over conductor 109 to other stages of the system) correspond to the 32 range information bits which may be displayed along each azimuth bearing in the antenna scan. Digressing briefly, and with reference to FIG. 1, it will be shown hereinafter that the display at position A (approximately 7 miles) will be the result of signal detection by the radar set 100 during the 30th bit output of the clock 106 of a time period which was initiated by transfer of a main bang pulse by the radar set 100, as the antenna ANT is directed along a bearing of approximately 20° to the left of the zero reference line.

With reference once more to FIG. 2, the radar signals as transmitted by the antenna ANT and reflected by an object in the path of the transmission are detected in conventional manner, and the radar video signals output from the set (normally to a cathode ray tube display) are fed over conductor 103 to a flip-flop circuit 110 which is keyed by clock 106. Since clock 106 runs at a rate which provides 32 bits for the period that signals returned from ¾ mile to 10 miles would be received (i.e., a signal over conductor 102 as each main bang is transmitted by the radar set starts clock 106 after a delay of 9.3 microseconds), the radar video signals on conductor 103 will be stretched into 32 bits of information which are fed over conductor 114 to scan converter circuit 116 of the system.

Flip-flop 110 is effective as a pulse stretcher to prevent the loss of storage of data during the period that the scan converter 116 is being loaded, and also to stretch a short pulse which might otherwise be lost. More specifically, as will be shown, scan converter circuit 116 includes shift registers, such as 118, 120, which are advanced by clock signals fed over conductor 109 to clock selector 123a, and then over conductors 126, 129' to load the successive incoming information bits therein. In the event that radar video pulses should end during the period that the shift register is receiving data, such information will be lost. Thus the pulse is stretched until such time the next shift pulse is generated.

With reference to FIG. 1, it will be seen that data information on conductor 103 is fed over a first input for flip-flop 110 and the clock pulses on conductor 108 are fed to the second input on flip-flop 110. As a result, pulse information on output conductor 114 has a leading edge which is determined by the video pulse on conductor 102 and a trailing edge which is determined by the clock pulse on conductor 108. Since the effective shift register in scan converter circuit 116 is advanced at the time the trailing edge of the clock pulse occurs, the data information on conductor 103 will not be lost, and the information input over conductor 103 will at all times be carried through the radar data input stage 101 to the shift registers in the scan converter circuit 116. The purpose of the left, right storage is to store data in one while the other is transferring data into the video storage circuit 140.

SCAN CONVERTER CIRCUIT 116

Figure 2:
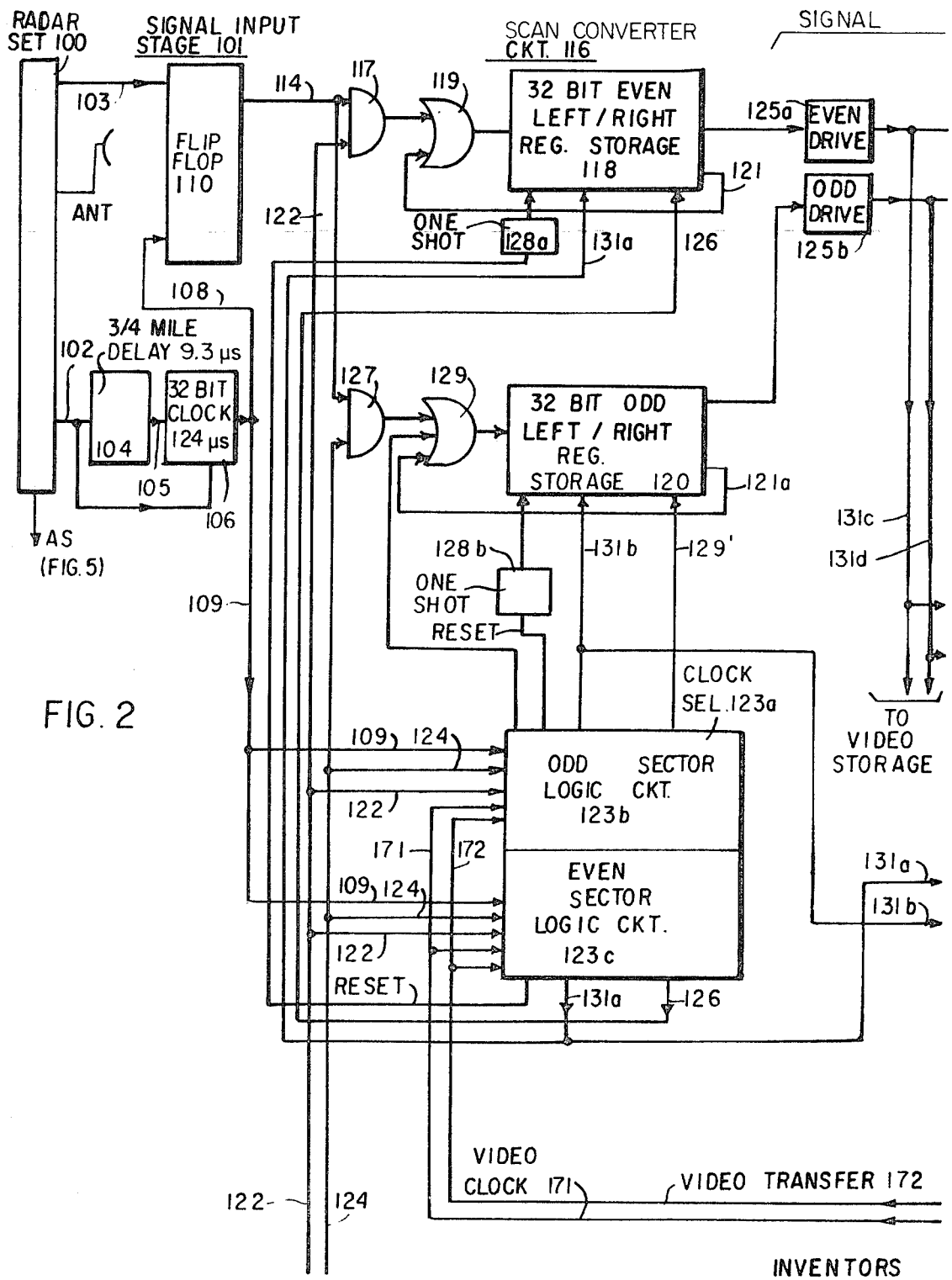

The scan converter circuit 116, as shown in FIG. 2 comprises two left/right 32 bit storage registers 118, 120, designated "even" and "odd" respectively, which may be of the type commercially available from Fairchild under Model Number U6B930079X four bit universal register cascaded eight times. Radar data bit information as clocked over lead 114 to one input of AND gates 117, 127 is gated through gate 117 or 127 as the case may be with application of a pulse to the second gate inputs by the pulse train transmitted over even, odd conductors 122, 124 from the antenna position indicator circuit 150, which pulses indicate the bearing of the antenna at the time of the receipt of the radar information over conductor 114, and specifically as to whether the antenna is on an odd or even bearing.

As will be shown, the even and odd registers 118, 120 are used alternately for storage of the bit information provided over conductor 103 as the antenna ANT is moved to successive azimuth bearings, it being noted that an azimuth bearing in the present system will include a sector of approximately 3°. Assuming, for example, that the antenna ANT is moved to the first azimuth bearing of the scan (42°–39°) to the left of the zero reference point in FIG. 1, and that the even register 118 is assigned by the pulse train on even conductor 122 to store the bit information provided on such bearing, gate 117 is enabled by the first pulse of the even pulse train output over conductor 122 from the antenna position indicator circuit 150 (FIG. 5) to pass the stretched radar video input over conductor 114 through OR gate 119 to the even shift register 118. Clock impulses which are received over conductor 126 from the clock selector 123a (to be described) which are in turn received over conductor 109 from clock 106 control the even shift register 118 to load the pulses in its 32 storage bins from the left to right in known manner.

With reference to target A shown in FIG. 1, as the antenna ANT advances to a relative bearing of approximately 21° (i.e., to the left of the zero reference line), and a radar video pulse return is detected, such radar video return is coincident with the 30th bit pulse of the radar video clock while the antenna is on such bearing, and the radar video will be fed into the 30th bin of the odd register 120 in the scan converter circuit 116 (see FIG. 1). The bit information thus stored (as will be shown) provides the target A on the display. During the period the antenna ANT moves through the azimuth bearing 21°–18°, and detects the target A, even though only one radar return is received at the 30th bin of the 32 bit shift register (accumulator), the accumulator stores the resultant radar video to represent target A. If succeeding returns are detected at the 30the bin, while the antenna is going through the 21°–18° sector, (and approximately 20 trains of radar clock pulses are occurring during the scan through the 30 sector), no effect will be seen on the display since the data has been stored in the 30the bin. Any other data detected in the 30the scan will be stored in the appropriate bin.

The even register 118 is used to store the radar information received in such manner in each of the other even sectors (i.e., 42°–39°, 36°–33°, etc.) and the odd register 120 is used to store the radar information received in each of the odd sectors (i.e., 39°–36°, 33°–30°, etc.). That is, in the foregoing example, the antenna ANT was assumed to be at an even azimuth bearing (42°–39°). If the radar antenna is at an odd azimuth bearing (as for example 39°–36°) a pulse output over conductor 124 from the antenna position indicating circuit 150 will enable the AND gate 127 and OR gate 129 to pass the transmission of radar video pulses on conductor 114 to the input circuit for the odd register 120. Clock pulses over conductor 129', as will be shown, load the 32 bits of each train into the bins of the odd shift register 120 from left to right, so that any target detected along such bearing will be temporarily identified in the system by appropriate signals in the odd shift register 120.

During the period of loading of the odd shift register 120 with the information detected in the odd azimuth bearing scan (i.e., 39°–36°), the information which has been stored in the even register 118 during the even azimuth scan (42°–39°) will be transferred via the antenna scan gating circuit 130 (FIG. 3) to the video storage circuit 140 which basically comprises a plurality of 32 bit shift registers, such as 142, the number of such registers being determined by the number of discrete azimuth sectors to be presented on the display 28 in the example shown in FIG. 1).

As noted above, the shift register 118 is loaded from left to right, such direction of loading being used by reason of the fact that the information input from the radar set 100 is, with reference to the illustration of FIG. 1, received in a direction which moves from bottom to top (that is, the signals for targets at closer ranges are received first and the signals for targets at successively further ranges are received at correspondingly later intervals). The radar information is therefore stored in the register 118 from left to right.

The signal information as transferred from the radar storage registers 118, 120, however, is stored in the video registers, such as 142, from right to left so that, in the ultimate readout of the information stored in the video storage registers, such as 142, the information is read from right to left whereby in accordance with conventional raster generation techniques, as the raster is traced from top to bottom, the stored signal information relating to the 10 mile range will be read out before the signal information for the 9 mile range, etc.

The information stored in each of the shift registers, such as 118, is recirculated over conductor 121 and fed to the second input of an OR gate, such as 119, concurrently with the receipt of the next set of 32 bits over the signal input stage 101. That is, assuming one scan has been made along a given azimuth, 32 bits of information will have been stored in one of the shift registers, such as 118. As the subsequent scan is made along the same azimuth (it being recalled that the horizontal cyclic rate of the antenna is 3 cycles per second), the data bits in the register 118 are fed out over the output lead 121 and through the OR circuit 119 so that the first 32 bits will be input back into the register in coincidence with the subsequent 32 bits input along the same azimuth bearing. As will become apparent, such mode of operation insures that any return signal on any scan of a sector will result in an indication on the display of a detected object so that maximum security is provided in effecting a display of even marginal type detections.

As noted above, as the antenna ANT moves to the next azimuth (i.e., now an odd azimuth) the information stored in the even register 118 is transferred to a selected one of the video storage registers in storage circuit 140, and after such transfer (and during the period of the odd scan) the even register 118 is reset in preparation for receipt of the detected signals during the next "even" scan. Reset of the even, odd registers 118, 120 is effected by a clock selector 123a to be described, which via odd and even sector circuits 123b, 123c controls one-shot gates, such as 128a, 128b in the reset of the register 118 as each vertical sync pulse occurs in a manner to be described.

ANTENNA POSITION INDICATOR CIRCUIT 150

Digressing briefly, it will be recalled that the position of antenna ANT is indicated to the system by an antenna position indicator circuit 150 (FIG. 5) which is responsive to the output signals of the conventional antenna on radar set 100, to provide signals over conductors 122, 124, to the scan converter circuit 116 of the azimuth being scanned (odd or even). Such circuit 150 also provides an indication to the video storage section 140 of the sector position of the antenna ANT (azimuth sectors 0–27 in the present example) whereby the return radar range information is ultimately fed into the registers of the video storage circuitry 140 which will result in presentation of the information at the proper position on the display.

Figure 6:
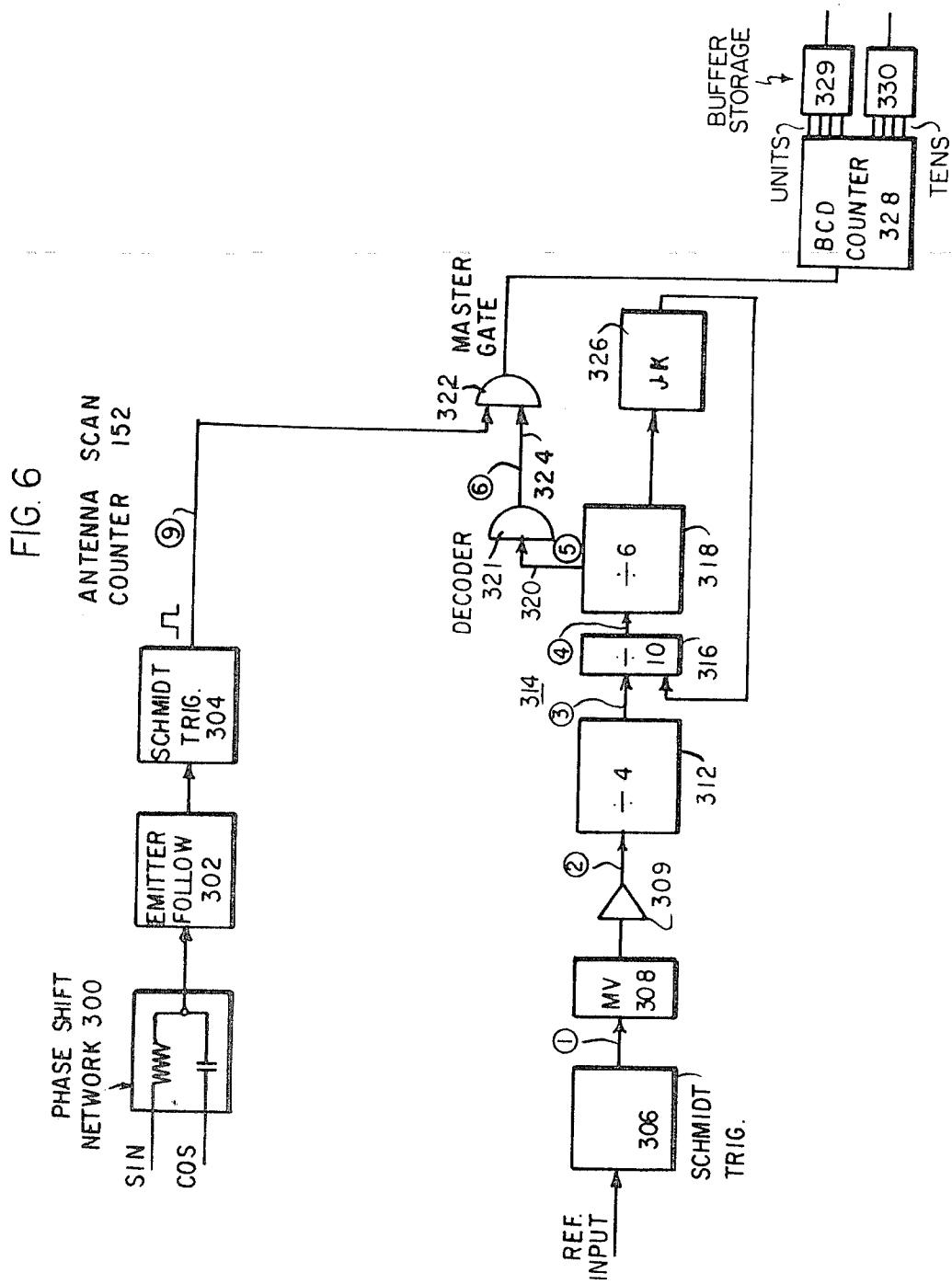
FIG. 6 is a diagram of the circuitry of the antenna scan counter shown in block in FIG. 5.

The radar antenna circuitry (for example a Clifton Electrical Resolver type CSH-10-AS4) for the described radar set provides a sine wave, a cosine wave and a reference sine wave which vary in phase for different positions of the antenna in its sweep through a 90° sector forward of the aircraft. In such systems, the phase of the combined sine-cosine signal is compared to the reference signal to provide an indication of the bearing of the antenna transmission. While various modes may be used to translate such signals into antenna bearing information, in the present arrangement the sine, cosine signals output from such circuit are fed over AS leads which include leads Sin, Cos, Ref, (FIG. 5) respectively to an antenna scan counter 152, which may be a counter circuit such as shown in FIG. 6 and 7, which converts such signals into a BCD code proportional to antenna position, which code is fed over path 153 and 153a to an antenna scan decoder 154 which may comprise logic gates connected to provide outputs such as 1, $\overline{1}$ as the counter is advanced with changing antenna position ( $\overline{0}$, $\overline{1}$ is the NOT of the signal output—0, 1 are positive pulses, $\overline{0}$, $\overline{1}$ are negative). Antenna scan decoder 154 also provides a second set of signals output from decoder 154 over paths 155, 156 to binary circuit 157, the pulse on conductor 156 occurring at the start of each antenna scan from left to right and the pulse on conductor 155 occurring at the start of each antenna scan from right to left. The pulses output from binary circuit 157 are OUT, $\overline{OUT}$, depending upon the one of the input conductors 155, 156 which is marked with logic 1. The OUT, $\overline{OUT}$ conductors are fed respectively to an associated input on gates 159, 160 respectively which are further gated by inputs from scan gates C, X, respectively. The $\overline{C}$ and $\overline{X}$ pulses are used to initiate the transfer of data from radar storage to video storage while the antenna ANT moves past bin 0 (as the antenna ANT goes from right to left) and from bin 27 (as the antenna ANT goes from left to right, respectively) and accordingly the scan gate signal C is applied to gate 159 immediately prior to the $\overline{0}$ signal and the signal X is generated immediately after the $\overline{27}$ signal. Such signals may obviously be provided by antenna scan decoder 154 or other suitable timing means operative to provide pulse C and X at such time. Gates 159 and 160 are AND gates which allow scan gate C or scan gate X to pass when the OUT or $\overline{OUT}$ pulse respectively is present as determined by binary 157. Binary 157 detects the direction (left or right) that the antenna is traveling.

It should be recalled that data is stored in the radar storage during one azimuth sector (3°) and transferred to video storage while the antenna ANT is in the subsequent sector. If the antenna ANT is moving left to right for example, pulse $\overline{1}$ transfers data gathered during sector $\overline{0}$ but if the antenna ANT is moving right to left pulse $\overline{0}$ is used to transfer information stored during sector 1.

In addition, as the antenna ANT moves to each even bearing, a logic 1 pulse is output from decoder 154 over path 162, whereby a first pulse train is provided over even conductor 122. The same pulse output is fed through inverter 163 so that a second pulse train inverted from the first train appears on conductor 124. The pulse trains on conductors 122, 124 being shifted 180° and being related to the antenna sector position, effect alternate gating of the information bits on conductor 114 by gates 117, 127, to alternate shift registers 118, 120 so that the information detected in alternate azimuth sectors (even, odd) is placed in the corresponding one of the even, odd registers 118, 120.

The pulse trains on conductors 122, 124 are also fed to sectors 123b, 123c of the clock selector 123a which, among other functions, responsively control the readout of the information in the idle one of the shift registers 118, 120 into an appropriate one of the video storage registers, such as 142 in video storage circuit 140. Transfer of the stored radar information to the video storage registers is controlled by the antenna scan decoder 154 over paths $\overline{0}$–$\overline{27}$ and $\overline{C}$, $\overline{X}$ and antenna scan gating circuit 130, as will be shown.

The antenna scan counter circuit 152 is shown in more detail in FIGS. 6 and 7. As there shown, the sine, cosine signals input over conductor Sin, Cos at the 2,045 Hertz rate are routed over a 180° phase shift network 300 and an emitter follower circuit 302 to a Schmitt trigger 304 which provides a square wave pulse output, the phase of which is determined by the relative phases of the sine, cosine signals. With reference to the timing diagram of FIG. 7, line 9 indicates the square wave output of such portion of the circuitry when the combined sine-cosine signal is of the phase shown immediately thereabove (i.e., variable phase).

The reference signal also at the 2,045 Hertz rate is likewise fed to a Schmitt trigger circuit 306 for squaring purposes, and the output signals will be that shown in line 1 of the time diagram of FIG. 7.

The squared reference pulse output from Schmitt trigger 306 is applied to a keyed multivibrator 308 which operates to provide output pulses at 1.3 MegaHertz during a part of the reference pulse period.

As shown in line 2 of the timing diagram, the keyed multivibrator operates at the 1.3 MegaHertz rate during the period of a reference pulse (line 1) which output is fed over amplifier 309 to a divide by four circuit 312, which provides an output of 1.3 MHz./4 = 325 Khz. to a 60 bit counter 314.

The 60 bit counter in the illustrated system comprises a divide by 10 circuit 316 and a divide by six circuit 318. As will be apparent from line 5 of the timing diagram, the 60 bit counter at the output of the divide by six circuit 318 provides 60 pulses over conductor 320 during the initial portion of each reference pulse, and decoder 321 selects pulses 10–50 of the 60 for output over conductor 324.

Flip-flop 326 resets the counter 316, 318 as the counter 318 advances past count 80 to prepare the counter for the next set of bits provided with receipt of the next reference pulse.

Master gate 322 operates to pass a number of the 40 bits output from the decoder 321 to the BCD counter 328 which number varies with the antenna position as indicated by the phase of the sine-cosine signal relative to the reference signal at inputs Sin, Cos, Ref.

More specifically, if the reference pulse and the pulse output from the phase shift network 300 are in phase the entire 40 pulses on conductor 324 would pass through the gate 322. As the phase displacement between the reference signals and the signal output from circuit 300 changes with movement of the antenna ANT to different positions, the time of generation of the pulse by trigger 304 is correspondingly changed and the number of pulses passed by gate 322 will vary correspondingly.

With the antenna ANT at the beginning point of its scan (left to right), the sine, cosine signals will be in phase, and the reference and variable phase signals will be out of phase by 90°, and as a result, none of the 40 bit pulses output from decoder 321 will pass through master gate 322. As the antenna ANT moves from left to right, the difference in phase of the variable phase signal output from the phase shift network 300 relative to the reference signal decreases, and the gate 322 will, in successive incremental movements of the antenna ANT from left to right, provide a train of an increasing number of pulses over its output circuit.

Stated briefly, with the movement of the antenna ANT from 0° to 180° of its azimuth bearings, the number of pulses output through master gate 322 will increase from 0 to 40, and the number of pulses output in a train from master gate 322 at any time will indicate the position of the antenna.

The trains of bit pulses output from the master gate 322 to indicate the antenna position are fed to a BCD counter 328 which may be of the type available from Fairchild Semiconductor as UGA 995879X, which operates in known manner to provide an output in a binary code indicating the number of bits received in each train. Different value counts thus indicate the different positions of the antenna.

The count output from the BCD counter 328 is fed to two buffer storage circuits which may be of the type available as Fairchild U6A995979X which store the BCD data in tens and units values. Buffer storage circuits 329, 330 remove the 2,045 Hertz frequency from the antenna scan counter system and the output is fed over units and tens paths, 153, 153a respectively to the antenna scan decoder 154 circuit (FIG. 5) which includes logic circuitry for indicating the count (and thus the azimuth bearing of the antenna) over conductors $\overline{0}$-$\overline{27}$. By way of example, during the period that the antenna ANT is directed along the azimuth bearing of 21°-18° (see FIG. 1), the output of the counter 328 (FIG. 6) is 7 and units conductors 3, 4 output from counter 152 will be marked with logic 1. As will be shown, with a count of seven output from counter 152, decoder 154 marks the $\overline{7}$, $\overline{9}$ output conductors of the group $\overline{0}$-$\overline{27}$ connected to the scan gates in antenna gating circuit 130 to effect storage of the 32 input bits from the radar system in the eighth register of the 28 video storage registers 0-27 (FIG. 3) which are used to store the information for the 28 azimuth sectors.

Briefly summarized, the antenna position indicator circuit 150 changes the 2,045 Hertz reference, sine and cosine signals output from a conventional antenna system as it moves through a scan to a decimal output $\overline{1}$, $\overline{2}$, $\overline{3}$, etc., which indicates the particular one of the azimuth bins in which the information detected by the radar set 101 is to be stored. In addition, antenna scan decoder 154 in antenna position indicator circuit 150 also marks the pulse train output conductors 122, 124 as even or odd, as the case may be, as the antenna moves through its scan. In the illustration of FIG. 1, wherein radar information is to be placed in azimuth bin 7 to represent detected target A, the odd conductor 124 will be marked and the odd shift register 120 will store the radar signal information which is received over the input circuit 101.

ANTENNA SCAN GATING

(DATA TRANSFER)

With reference once more to FIG. 3, it will be recalled that the radar information stored in the one storage register, such as 118, as the result of a radar main bang, is transferred from such register 118 to a register in the video storage circuit 140 during the period that further radar information resulting from a subsequent main bang is stored in the alternate shift register 120 in scan converter circuit 116. The transfer of the information from the shift registers 118, 120 in the scan converter circuit 116 to the registers in the video storage circuit 140 is basically controlled by a vertical clock generator 170 which is in turn driven by the vertical and horizontal sync output pulses of the timing generator 191 for the video display system which may be a conventional TV timing generator, such as an EIA Standard 15.750 KiloHertz to 60 Hertz countdown unit.

Vertical clock generator 170 is operative in response to each vertical sync pulse to provide 32 horizontal bit transfer pulses during the 2 millisecond period which occurs between the initial line trace of the raster and the generation of the 10 mile range line on the display (FIG. 1).

As the video transfer clock input pulses are fed over path 172 to the even and odd sectors 123b, 123c of clock selector 123a, the appropriate one of the sectors 123b, 123c as enabled by the antenna scan pulse train on conductor 122, 124 (as the case may be), gates the 32 clock pulses output from vertical clock generator 170 to the associated registers 118, 120 to effect alternate readout of the information in the associated register 118, 120 in serial form over the amplifier stages 125a, 125b to the antenna scan gating circuit 130.

If, for example, the antenna ANT is in an even azimuth scan, the pulse output from antenna position indicator 150 on conductor 124 will block AND gate 127 and the input to the odd register 120 and will control the odd sector logic circuit 123b to gate the 32 video clock pulses on conductor 171 over conductor 129' to effect transfer in serial form of the pulses in shift register 120 over drive circuit 125b to the antenna scan gating circuit 130. Alternatively, if the antenna is in an odd scan, the pulse output on conductor 122 will block AND gate 117 and control the even sector logic circuits 123c to gate the 32 video clock pulses on conductor 171 over conductor 126 to transfer the pulses in register 118 over amplifier 125a to antenna scan gating circuit 130.

ANTENNA SCAN GATING CIRCUIT 130

The antenna scan gating circuit 130 in the illustrated embodiment includes 14 odd data transfer gates, such as 132, and 14 even data transfer gates, such as 134, which operate to control transfer of the information for the successive 28 azimuth positions as alternately provided by the shift registers 118, 120 to the 28 registers, such as 142, in the video storage circuit 140.

Each data transfer gate, such as 132, 134, comprises a NOR gate having two inputs which are connected to the output of the antenna scan decoder 154 in such manner that the NOR gate which controls transfer of the first azimuth signal set to be detected by the radar to the first video storage register 142 will be enabled during the period of the second sector scan by antenna ANT. More specifically, assuming that the first set of information to be detected is at −42° (i.e., 42° to the left of the zero plane line in FIG. 1), and that such information is stored in the even shift register 118, as the antenna moves to the right to search for objects in the second azimuth bearing (−39°), the signals on the $\overline{C}$ conductor (FIG. 5) from the antenna scan decoder 154, binary counter 157 and NAND gate 160 via path 161 enables one input to NOR gate 132 (FIG. 3) and the signal on the $\overline{1}$ conductor output from the decoder 154 enables the second input of the NOR gate 132. The output of gate 132 as enabled and the output of even sector 123c on pulse conductor 131a (to be described) during the period the odd register 120 is being loaded with information detected on the successive antenna bearing results in the enablement of NAND gate 136 which via conductor 144 enables switch 138 in the transfer of the 32 bits of information which were provided during the −42° beam scan and placed in the even register 118. Such transfer is effected from register 118 over amplifier 125a, inverter I, conductor 143 and switch 138 to the first video storage register 142 (No. 0), and is effected during the time period that the antenna is scanning the −39° bearing (ie., antenna scan decoder 154 marks the $\overline{1}$ conductor when the antenna ANT moves from right to left and marks the $\overline{C}$ conductor when the antenna moves from left to right). In a similar manner, gate 134 (No. 1) is enabled by pulse signals placed on the $\overline{0}$, $\overline{2}$ output conductors by antenna scan decoder 154 during the same period the information for the −36° to −33° scan is being stored in the even register 118 (i.e., $\overline{0}$ for left to right scan and $\overline{2}$ for right to left scan).

With the gated output of NOR gate 134 and the odd control transfer pulse output from the odd sector 123b over conductor 131*b*, gate 137 enables switch 138*a* to pass the information stored in register 120 to video storage register No. 1 during the period that the 36°–33° bearing is being scanned.

As the antenna ANT proceeds in its scan to sector azimuth −21° to −18° the signals which represent the object detected at point A (FIG. 1) are stored in the odd shift register 120 and as the antenna advances to bearing −18°, a NOR gate (not shown but similar to gate 134) which is enabled by $\bar{6}$, $\bar{8}$ signals output from the antenna scan decoder 154 will control an associated gate, similar to gate 137, and a switch similar to 138*a* to feed the information in the odd register 120 into the associated one of the shift registers No. 7 (not shown) in the video storage circuit 140.

VIDEO STORAGE CIRCUIT 140

The video storage circuit 140 basically comprises 28 National Semiconductor Type MM505 DUAL 32 bit static shift registers, each of which is preassigned to store the 32 bits of information detected for a particular set of azimuth bearings. The first shift register No. 0 (142) as noted above, stores the 32 bits of information detected by the radar set 100, in the scan of the azimuth bearing −42° to −39°, the second shift register No. 1 (142A) stores the information detected along bearing −39° to −36°, etc.

The input circuit for each shift register, such as 142, includes a multiplex switch, such as 138, which selectively feeds the serial information received from the shift register 118 in the scan converter circuit 116 when enabled by the antenna scan gating section 130, and which during the periods when not enabled in such manner, effects recirculation of the information in the video storage register 142 from its output over conductor 148 to gate 151 at the frequency of the vertical clock 170.

With reference to the first shift register 142 and the multiplex switch 138 associated therewith, it will be apparent that switch 138 basically comprises a NAND gate 150*a* having one input connected over conductor 144 to the output of the data transfer gate 136, and a second input connected over conductor 143, inverter I and amplifier 125*a* to the output of the radar storage register 118 so that NAND gate 150*a* is enabled by the antenna scan gate 136 (which indicates the position of the antenna) and the concurrent bit pulses from the radar storage register 118. The transfer of the bit from register 118 to register 142 is at the linear rate of the video clock pulses provided by vertical generator 170 and clock selector 123*a* over conductors 126, 129'. Such pulses as received through gate 152*a* and over conductor 152*b* at the input for register 142 are stored in the conventional manner.

During the period a new set of bit pulses is thus fed to register 142, the signals on conductor 144 pass through the inverter 147 to block an associated NAND gate 151 and thereby prevent passage of the signals which are clocked out of the register 142 from recirculating through NAND gate 151, NOR gate 152*a* and over conductor 152*b* to the register input. In the absence of the blocking signal at the second input of the NAND gate 151, information output from the register 142 is circulated back through NAND gate 151, NOR gate 152*a* and over conductor 152*b* to the register input as clocked at the vertical clock frequency of the television timing circuit by a nonlinear train of signals which are provided over conductor 174 by clock generator 170 as will be described.

With reference once more to the signal information, such as provided for target A (FIG. 1) which is being processed through the system, as the antenna ANT advances to the azimuth bearing represented by the ninth sector (−18° to −15°) the 32 bits of information for the eighth sector including the bit related to target A are transferred via a multiplex switch (not shown but similar to switch 138) to the eighth register (not shown but similar to register 142) in the video storage section 140. The 30th bit of the 32 bits of information fed to the eighth register (No. 7) indicates the range of the target as approximately 7 miles (see FIG. 1). Since such information was the 30th bit of the radar train input to the radar storage register 118. However, since the information was read out of the radar storage register 118 from right to left, such bit is now stored in the 30th bin (from the left) in register No. 7 of the video storage circuit 140. As will be shown in recirculation of the bits in the registers in group 140 from left to right, the bit for target A in register No. 7 will appear as the third bit in each recirculated train output from register No. 7 whereby the information will be displayed in the raster at the third range position from the top (7 miles—FIG. 1).

CLOCK SELECTOR

ODD SECTOR

With reference to FIG. 8, there is shown thereat in more detail, the odd sector 123*b* of the clock selector 123*a* which controls the storage of the radar video in shift register 118, 120 and the transfer of the radar information from shift register 118, 120 to the ones of the bins of the registers in the video storage circuit 140 which will result in the display of the information at the proper position on the display format.

With reference first to the antenna scan lead 124 (FIGS. 2 and 8), it will be recalled that the shift registers 118, 120 are alternately enabled by the pulse trains on even, odd conductors 122, 124 in accordance with the position of the antenna indicated by the pulse train on such conductors.

Returning once more to the earlier example and FIGS. 1, 2 and 8, as the incoming radar video signals which are the result of the antenna scan in the odd azimuth bearing −21°, −18° are received, the odd antenna scan pulse train over conductor 124 will enable the AND gate 127 to cause the 32 bit radar video information provided by clock 106 in the input stage 101 to be fed into the odd storage register 120. During the period that register 120 is thus enabled, the radar system 100 will transmit a series of repetitive bursts (with the radar set used in the present example approximately 20 successive radar transmissions of 1.24 milliseconds will be effected during the period of scan from −21° to −18° which are stored in the odd register 120).

Each time that the radar set 100 transmits a "main bang" to initiate such a transmission, and the radar clock 106 generates the 32 clock pulses for dividing the radar information into bits, the same pulses are input over conductor 109 to the odd and even sectors in the clock selector 123*a* (FIG. 8). With reference to FIG. 8, such pulses are applied to AND gate 180 which is also gated at this time by the antenna scan pulse on conductor 124 whereby the 32 pulses on conductor 109 are transmitted through AND gate 180 and OR gate 181 and OR gate 182 to the video clock lead 129' which goes to the odd shift register 120. As the 32 clock pulses are fed over lead 129' to the register 120 (FIG. 2), the register loads each of its bins in succession with the successive ones of the radar video information bits which are received through AND gate 127 and gate 129. In the present example, as the 30th clock bit occurs, the information input over the radar video conductor 114 will be a positive pulse as the result of the detection of the target at position A (FIG. 1) and such pulse will be fed through gate 127 (FIGS. 2 and 8) and gate 129 into the 30th bin of odd register 120. As will be shown, the second input to AND gate 129 is controlled by an inhibit circuit which prevents radar storage during the period information is being transferred from the radar storage circuit 120 to the video storage circuit 140.

As the antenna ANT advances to the next azimuth sector (even sector No. 8), the previous antenna scan pulse (positive) over conductor 124 is terminated, and the next pulse (negative) on such conductor 124, will block AND gate 180 to block the radar clock pulses on 109 from the odd shift register 120, and controls gate 127 to block radar video input to the odd storage register 120. The positive pulse which is applied to the even conductor 122 as the negative pulse is applied to conductor 124, enables the even sector 123*c* (which is similar to illustrated odd sector 123b) and operates in like manner during the next even sector scan (−18° to −15°) to load the incoming radar bit pulses into the even shift register 118.

It is necessary that loading of a shift register, such as 120, once started, will always be completed (i.e., if the clocking pulses input over conductor 109 were stopped during the middle of a clocking operation, the associated shift register will be partially loaded, and an incomplete and possibly improper set of information would be displayed).

For this purpose, as shown in FIG. 8, the radar clock pulses input over conductor 109 are also transmitted to one input of an AND gate 184 which has a second input controlled by a one-shot retriggerable circuit 185 which provides a delay of 1.24 milliseconds to permit the radar clock to advance the shift register through a cycle, once initiated. The one-shot circuit 185, in turn, is triggered by the AND circuit 160 which is enabled as each odd train pulse is received over conductor 124 from the antenna position indicator circuit 150.

After a delay of 1.24 milliseconds, the AND gate 184 will be turned off, and no further radar clock pulses will be provided over conductor 129′ to the odd shift register 120 (at this time however the 32 bits of information input over conductor 114 will have been stored in the bins of the odd shift register 120). In addition as the delay period expires, the output of the one-shot circuit 185 as fed through an inverter and over conductor 186 provides a ready-to-transfer signal to a J-K flip-flop circuit 188 to prepare for the transfer of the pulses from the odd shift register 120 to the appropriate one of the registers in the video storage circuit 140 (shift register No. 7 in the present example).

That is, it will be recalled that during the period information is being loaded in the odd register 120 the information in the even register 118 is being shifted to the video storage circuit 142. In the present example, during the period the even register 118 is being loaded with the information for the even sector No. 8 (−18° to −15°), the information for odd sector −21° to −18° in the odd register 120 will be transferred to the video storage register No. 7 in group 140 under control of odd sector 123b. It will be recalled that the transfer of the information from the register 120 in scan converter circuit 116 to the proper register in video storage circuit 140 is effected at a rate which is in no way related to the rate at which the antenna is operated or the rate at which the radar information is gated into the shift registers 118, 120. Accordingly, the clock selector circuitry 123a must necessarily determine and establish time periods which permit transfer of the information stored in registers 118, 120 over the system to the video storage registers in such way that no information is lost.

With reference once more to FIG. 8, an AND gate 187 is provided which has a first input circuit connected over conductor 172 to receive the video transfer pulse output of vertical clock generator 170 (FIG. 3) which as noted heretofore is enabled by the vertical sync output of a timing generator circuit 191 for a conventional television monitor set 192, and a second input which is connected over conductor 171 to receive a clock output of vertical clock generator 170 which provides 32 video clock bits at the horizontal rate of the timing generator circuit 191 at a time determined by the vertical clock generator 170. The timing generator 191 and deflection circuitry 191a as noted above controls a conventional television monitor 192 in known manner to provide a raster trace on the display area of the monitor 192.

The video transfer pulses and the video clock pulses are supplied over conductors 172, 171 respectively to two inputs of AND circuit 187 (FIG. 8) during the raster trace for gating to AND circuit 194 which is blocked until such time as the flip-flop circuit 188 is enabled by the ready-to-transfer pulse over conductor 186 to provide a gating pulse to the second input of AND gate 194. As noted above, the ready-to-transfer pulse occurs 1.24 milliseconds after the start of the last train of radar pulses is received for an odd sector (i.e., as antenna ANT moves to an even azimuth sector the pulses on conductor 124 block gate 180 and no further enabling pulse is received for the one-shot circuit 185). Since the 1.24 millisecond delay will be over as the last pulse of the incoming train of radar pulses is received, the trailing edge of such pulse over inverter I sets the J-K flip-flop 188 which in turn enables gate 194.

As the first vertical sync pulse from the timing generator 191 (FIG. 4) is supplied to the vertical clock generator 170 (FIG. 3) after the antenna scan has moved to a new sector (even) and turned off the radar clock gate 180 (FIG. 8), and the one-shot circuit 185 has provided the ready-to-transfer pulse on conductor 186, the video clock train on conductor 171 will be gated through gates 187, 194 and 182 and over conductor 129′ to gate the information in the odd shift register 120 (FIG. 2) over odd drive circuit 125b, and the antenna scan gates to the video storage registers Nos. 0–27.

As noted hereinabove, the bits are transferred from the odd shift register 120 in the reverse manner from that in which the bits were loaded. Accordingly, when the first transfer pulse is received subsequent to operation of the flip-flop circuit 188 (FIG. 8), the two inputs to AND gate 200 are enabled to gate the video transfer pulse on conductor 172 to the left/right select conductor 131b which causes the shift register 120 to now read out the 32 information bits from right to left so that the information bit which was stored in the 30th bin on register 120 to represent a target at position A will now be read out as the third bit of the 32 transfer bits. The same pulse on conductor 131b is fed to the odd scan gates, such as 137 (FIG. 3) in antenna scan gating circuit 130 to prepare for the gating of the information in odd register 120 (FIG. 2) to the video storage register No. 7 as gated out of shift register 120 by the pulses on conductor 129′ (FIG. 8).

At such time as the 32 radar information bits in the shift register 120 have been transferred to the proper video storage register (No. 7 in the present example), there is no need to permit transfer of further information and the possible introduction of spurious signals. Therefore, the next video transfer pulse which is received during the period that the odd shift register 120 is in the transfer mode will result in the J-K flip-flop 188 being turned off and the disabling of AND gates 194 and 200. As AND gate 200 is disabled, the resultant signal through inverter 201 and over the reset conductor triggers one-shot circuit 128b which resets all storage bins on the shift register 120.

Such shutoff is further desirable in that it protects against more than one shift of direction in transfer of the register during the transfer period. The equipment remains in this condition (i.e., the gating circuitry for the even register 118 enabled to load the incoming bits into the even register 118, and the odd register in the quiescent unloaded condition), until such time as a further antenna scan pulse is received over conductor 124 at which time the AND gate 127 for the odd register 120 is once more gated on and the odd shift register 120 is once more conditioned to receive the next set of radar information bits for the subsequent odd azimuth sector (No. 9 in the foregoing example).

READOUT OF VIDEO STORAGE CIRCUIT 140

It will be recalled that the registers Nos. 0–27 in the video storage circuit 140 (FIG. 3) which are 28 in number, each have 32 bins, each of which bins stores a different bit therein. It will be further recalled that each register in the video storage circuit 140 represents (and is connected to store) the information for one azimuth sector. In the illustration of FIG. 1, the target is shown to be located in the eighth sector (bearing −21° to −18°) of the display and to be at a range of approximately 7 miles. As described above, the signal which represents such information was stored in bin 3 of the eighth register No. 7 (not shown) of the video storage circuit 140. In the readout of such information from the register and conversion thereof for display on the television raster, it is necessary not only to place the target information in real world perspective on the television monitor format, but additionally to provide such information on the matrix of the television monitor 192 so as to provide improved resolution in the closer ranges. The timing generator circuit 191 in addition to controlling the vertical generator 170 in the generation of video clock pulses over conductor 171 and a video transfer pulse over conductor 172, as described above, also operates in conventional manner to generate horizontal signals for providing a normal raster on the monitor unit 192.

With reference first to the vertical clock generator 170 and to the pulse train shown adjacent the vertical right hand edge of the display in FIG. 1, it is noted that the nonlinear output train from clock generator 170 for each vertical trace comprises two pulses each of which exists for 32 horizontal raster line traces, eight pulses which occur for eight horizontal raster lines, eight pulses which occur for six horizontal raster lines, eight pulses which occur for four horizontal raster lines and eight pulses which occur for two horizontal raster lines. (Since drawing size does not permit showing of the entire train, only representative pulses of each group are shown in the train in FIG. 1.)

In the present system which provides a usable raster of 224 lines, the first 64 lines of the raster trace are used for data transfer purposes (i.e., from the scan converter circuit 116 to the video storage circuit 140).

While various circuit embodiments may be used as a vertical clock generator 170 to provide such pulses, one such circuit arrangement, as shown in FIG. 9, may comprise a variable module counter 250, such as the type commercially available from Fairchild as Model No. 9316, which is adjustable to advance to different counts by merely placing correspondingly different input codes into the counter 250.

Variable counter 250 is triggered by each horizontal sync pulse input over conductor "h" from the timing circuit 191 (FIG. 4) and is operative to count each such pulse received after reset by the vertical sync pulse on conductor "v" at the start of each raster trace. With reset by the vertical sync pulse, the counter 250 is set to operate in the divide by eight mode, whereby an output pulse is generated after each eight raster lines and fed to a divide counter 254 and to gate 252. A decoder 253 which has logic gates connected to detect different counts of the counter 254 has an output lead for controlling setting of counter 250, an output conductor connected to one input of gate 252 and a further output conductor connected to one input of gate 263.

Counter 254 is reset by the vertical sync pulse at the start of each raster trace and in its reset condition, decoder 253 blocks gate 252 and enables gate 263. As a result, the 32 bit output of clock 260 which is gated by each horizontal sync pulse in a raster is fed over gate 263 and conductor 171 to the clock selector 123a (FIG. 2) to effect transfer of the information bits in the shift registers, such as 118, to the appropriate video storage register, such as 142, in the manner described above. The pulse output on conductor 251 after every eight lines is blocked from the vertical clock output conductor 174 during such period.

As the counter 254 advances eight counts (i.e., 64 lines counted by counter 250 in the divide by eight mode) decoder 253 detects such condition and unblocks gate 252 and blocks gate 263. As a result, further pulses which appear on conductor 251 during the raster trace are fed over conductor 174 to the shift registers i.e., after the first 64 raster line traces).

The output of the clock 256 will be apparent by reference to the train shown in FIG. 1 adjacent the right hand margin of the display. Briefly, between lines 64–128 decoder 253 controls counter 250 to operate in the divide by eight mode, whereby a pulse is provided to counter 254 and over conductor 174 after each eight raster lines. At such time as the count on divide by eight counter 254 registers eight such pulses the decoder is enabled to shift counter 250 to a divide by six count, whereby after each six lines a pulse is output to divide counter 254 and over conductor 174. The cycling continues in such manner with the counter being shifted to the divide by four mode after eight pulses separated by six raster lines, and being shifted to the divide by two mode after eight pulses separated by four raster lines. As the counter provides the eight pulse seperated by two raster lines the raster trace is complete.

Briefly summarized, the pulses in terms of horizontal line traces in a raster are generated as follows:

8 × 8 = 64 lines (transfer)
8 × 8 = 64 lines (blanking)
8 × 6 = 48 lines
8 × 4 = 32 lines
8 × 2 = 16 lines/224 lines Counters 250, 254 are reset at the start of the next raster trace by the vertical sync signal on conductor "v."

It will be apparent from the foregoing that the frequency of the readout pulses is nonlinear, and increases with raster progression (i.e., eight pulses of eight lines each, eight pulses of six lines each, and eight pulses of four lines each, eight pulses of two lines each) whereby in the readout of the information in successive groups of bins any given register of the 28 registers will be at a varying frequency rate. The first eight storage bins of each register 1–27, for example, which store the first eight bits representative of information in the 6–10 mile range in the 28 sectors will have a readout time which is substantially longer than the last eight bits of the same register which represent information at the 3/4 mile range (in a ratio of approximately 4:1). Since the first eight readout pulses (which are of longer duration) occur at the top part of the raster trace and the last eight readout pulses (which are of a shorter duration) occur at the bottom of the raster trace, vertical perspective is provided to the display.

In the example of FIG. 1, the target at position A is represented by information in one bin (the third video bin of the eighth video storage register) and accordingly readout of such information from such bin will occur for a time period which extends for eight raster line traces (i.e., approximately lines 132–140 in the raster trace). It should be appreciated, of course, that if the target A were of a larger vertical size, such information would occur in an additional number of bins of the storage register, and if the target were wider, similar information would be stored in the third bin of adjacent registers (No. 6 and/or No. 8 in the present example).

The 10 mile, 6 mile and 3 mile range circuits 280, 281, 282 are also clocked by the vertical sync pulse at the start of each raster. The 10 mile circuit 280, for example, includes a delay circuit 283 which provides a pulse output with a circuitry of approximately B-4 msec. after the vertical sync pulse, so that the range line will extend horizontally shown in FIG. 1. The output pulse is fed to a differentiation circuit 284 comprised of capacitor 285, resistor 286, which differentiates the trailing edge of the delay pulse and feeds such differentiated pulse to an amplifier 287 which saturates and provides a square wave pulse output over conductors 273, 273a to the electron gun of the monitor 192, the pulse having a duration in time which is equivalent to two horizontal line traces on the raster. The 6 mile range circuit 281 is of similar arrangement and includes a delay circuit 284 which provides a pulse output over conductor 288 of approximately 8 msec. after the vertical sync pulse, and the 3 mile range circuit 282 includes a delay circuit 290 which provides a pulse output over conductor 289 approximately 12 msec. after the vertical sync pulse.

HORIZONTAL GATING

The information in the registers 0–27 in the video storage circuit is gated out for display on the raster by horizontal gates, such as 210, 211 (FIG. 4) etc., which occur at the horizontal rate, which are of progressively increasing frequency as each raster trace occurs.

Figure 4:
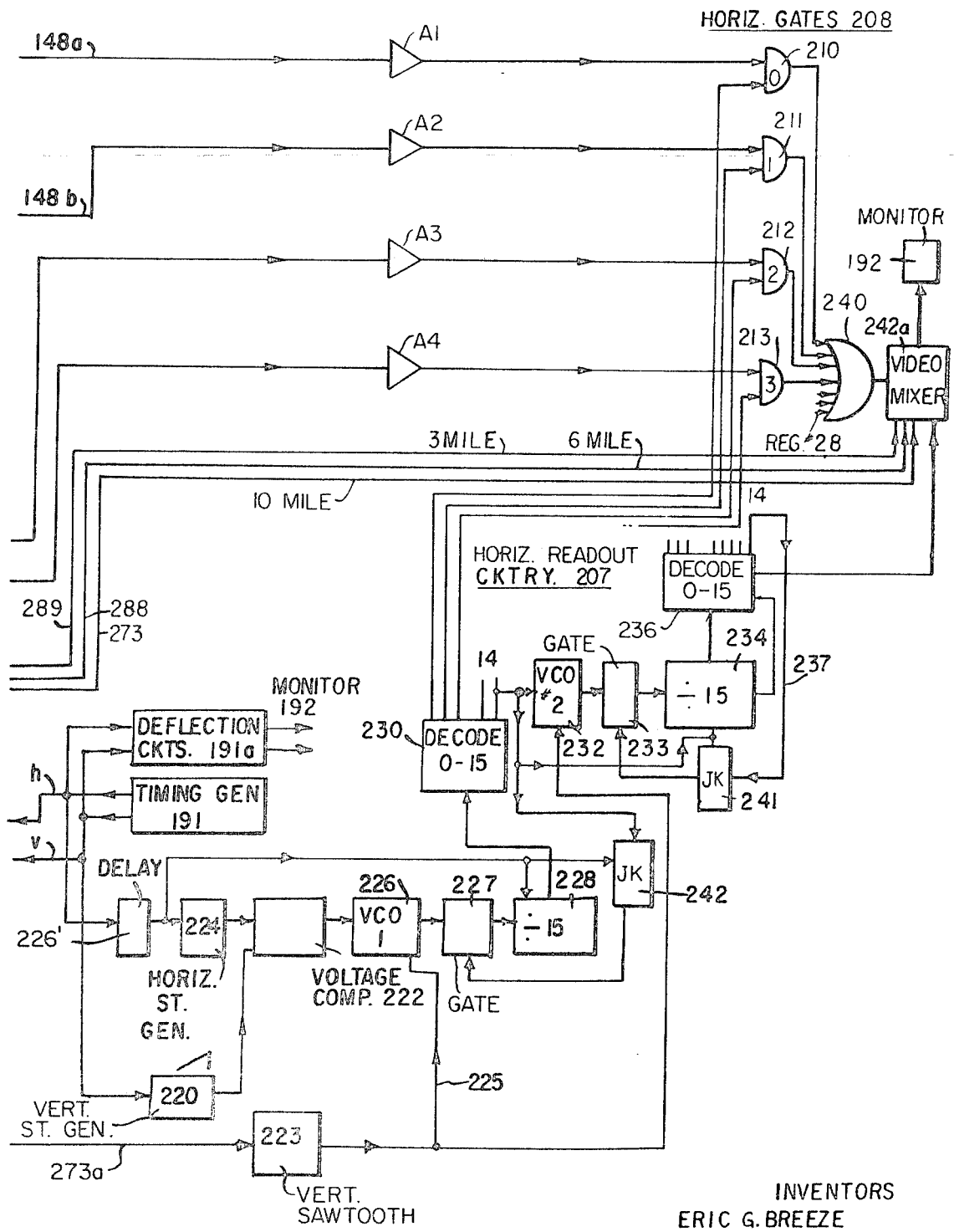
Figure 5:
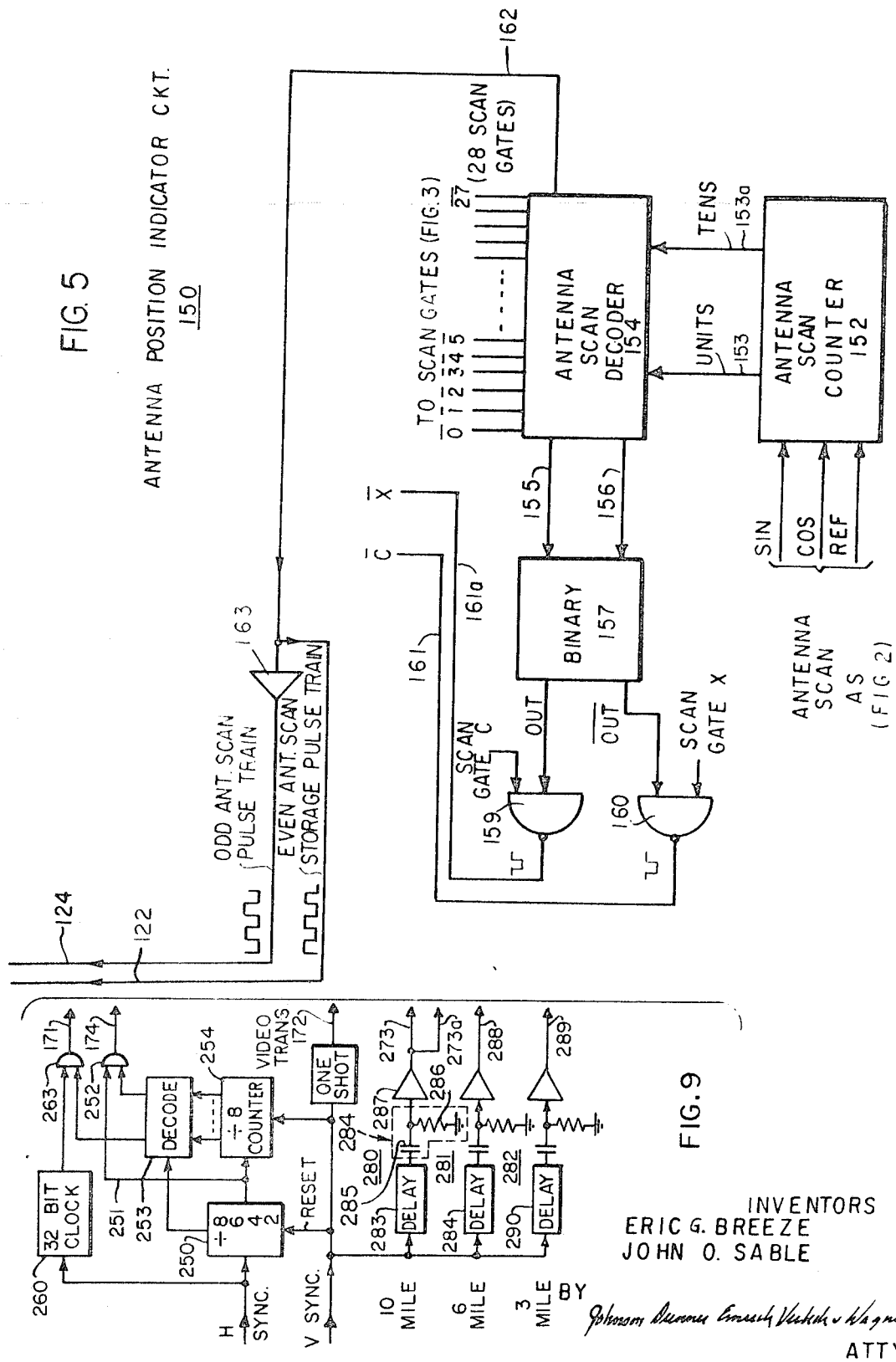

It is initially noted that the 32 nonlinear pulse output from the vertical clock generator 170 as each vertical pulse is generated by timing generator 191 is fed to the shift (clock) input of each of the registers 0–27 in the video storage circuit 140 (FIG. 3) and the bit information in the registers is recirculated to appear at the one output for an associated one of the horizontal gates 208. As noted earlier, the first two pulses of 32 lines each, occur prior to the display of information on the raster (i.e., the 10 mile line). As a result of the third clock pulse of the vertical train, the information on the first bin of each register appears at the respective outputs, such as 148a, 148b, (FIG. 3) each of which is connected over an amplifier such as A1 to one input of an associated one of the horizontal gating circuits 208 (FIG. 4). As noted above, the third clock pulse has a duration of eight raster lines. As the next vertical clock pulse on conductor 174 occurs, the registers 0–27 shift, and the information previously in the second bin appears at the output side of each of the registers for the duration of the next eight raster lines.

Readout of the pulses in the registers to the horizontal gate 210 (FIG. 4) etc., continues in a continuous cyclic manner at the raster rate. That is, one readout of the information in each of the 32 bins in each of the 28 registers is effected for each raster trace, the readout of the information on the successive bins being for shorter periods of time as determined by the duration of the different clock pulses of the vertical train.

The horizontal readout circuitry 207 which is operative with the vertical readout generator 170 is shown in FIG. 4, and as there shown comprises a vertical sawtooth generator 220 which is driven from vertical sync output of the timing generator 191, whereby a vertical sawtooth output is provided by generator 220 at the vertical scan rate of the television timing circuit 191. The output sawtooth is fed to one input of a voltage comparator 222. A horizontal sawtooth generator 224 which controlled in its operation by the horizontal sync output of the television timing circuit 191 via a delay circuit 226', has its output connected to the second input of the voltage comparator 222. The output of the voltage comparator 222 is fed to a first voltage controlled oscillator 226, which for purposes of example will be assumed to be initially operative at 0.33 MegaHertz. The output of the voltage controlled oscillator 226 is fed through a gate 227 to a counter 228 which counts to 15, and has its output connected to a decoder 230 to provide an output pulse successively over each of the conductors 1–14 as counter 228 advances each count. There are 15 decoded output states. However, only 14 are usable as the decoded zero is active while in standing and reset modes. The 14 output conductors of decoder 230 are connected in order respectively to the second input on the first 14 horizontal gates 210, 211, etc. The trailing edge of the 14th output of decoder 230 operates a J-K flip-flop 242 which disables gate 227, stopping the advance of counter 228 by oscillator 226.

As will be shown, a second voltage controlled oscillator 232 is connected to the 14th output of decoder 230 and a flip-flop 241 is also connected to the 14th output of decoder 230. At the 14th count, counter 228 via decoder 230 starts voltage controlled oscillator 232 and activates the reset on J-K flip-flop 241 which operates gate 233 to pass the pulses from oscillator 232 to counter 234 which has an associated decoder 236 connected to the output thereof. The outputs 1 through 14 of decoder 236 are connected to horizontal gates 14–27 (not shown) of the group 208. On the trailing edge of the 14th count of counter 234 decoder 236 controls J-K flip-flop 241 to change state thereby closing gate 233 and stopping advance of counter 234.

The counter 228 and flip-flop 242 are reset by the delay pulse output from delay circuit 226' in each horizontal line trace. As flip-flop 242 changes state, gate 227 opens and the oscillator 226 advances the counter 228 as described above.

The horizontal readout circuitry is provided for the purpose of providing improved resolution at closer ranges. More specifically, samples of the information on the first bin of each of the 28 video storage registers will be provided for eight raster lines to the one input of the 28 horizontal gates 210, 211, etc. During the first raster line trace the output of the vertical sawtooth from generator 220 is of a lower value (as for example 1 volt) and the horizontal sawtooth 224 will be read as a value of 1 volt early in the first raster line trace so that voltage will detect comparison early in such line trace and turn on the voltage controlled oscillator 226 at such time which in turn drives the counter 228 through gate 227 at a frequency determined by the value of the vertical sawtooth input to the variable voltage oscillator from circuit 223 (assumed to be 33 MegaHertz at 1 volt output of the vertical sawtooth generator).

Counter 228 counts the signal output from the oscillator 226 and as it advances over the 14 counts, decoder 230 provides pulses successively to the horizontal gates 210, 211, etc., in the successive intervals of the first raster line trace. Control gates 210, 211, etc., as enabled gate the information in the first bin of each of the registers 1–14 through NOR gate 240 and video mixer 242a to the electron gun on monitor 192. As will be apparent from the display in FIG. 1, only the information in registers 5–22 will appear on the first line of the raster display.

Briefly, as the first decoder 230 advances to the 14th count (the zero count on the decoder not being used), a signal on the trailing edge of the 14th count operates J-K flip-flop 242 to block gate 227 to prevent further advance of counter 228 by oscillator 226, and the same signal enables the second voltage controlled oscillator 232 to provide a pulse output at the same frequency (i.e., as controlled by the vertical sawtooth input over conductor 225) over gate 233 to the second 14 count counter 234. As the counter advances through the next 14 counts (i.e., 15–28) the horizontal gates (Nos. 14–27 of the group 208) which are connected to the outputs thereof are enabled to sample the output of the 14th through 27th registers in the video storage circuit 140, and the video information in the first bin thereof is fed over NOR gate 240 and video mixer 242a to the monitor device 192.

On reaching the trailing edge of the 14th count, the signal over the output lead 237 of the decoder 236 operates flip-flop 241 to disable the gate 233 connected to the output circuit of the oscillator 232.

In the next raster line the pulse output from delay circuit 226' enables the horizontal sawtooth generator 224, the output of which is fed with the vertical sawtooth 220 to the voltage comparator 222 and as the horizontal pulse reaches the value of the vertical sawtooth, the voltage comparator 222 provides an output pulse to start oscillator 226 in the generation of the next set of 14 pulses.

The pulse output from delay circuit 226' resets counter 228 and flip-flop 242. With flip-flop 242 reset, the blocking signal which was previously fed to gate 227 is removed and the output pulses of the first oscillator 226 which are provided after the delay will be fed to the first counter 228. As the second line of the raster is traced in such manner, a second set of sampling pulses 0–27 is fed to the horizontal gates 0–27 to effect a second sampling of the information in the first bin of the video storage register in like manner.

It will be apparent from such description as to how the registers 0–27 are sampled in successive line traces of the raster to provide the video information stored therein for the successive azimuths to the monitor for display. As the raster progresses and the pulses of the vertical pulse train decrease in duration, the successive bins of the registers are sampled for smaller periods of time and appear along a correspondingly smaller vertical dimension on the display. Improved resolution is basically achieved during the raster presentation by changing the operating frequency of the two voltage control oscillators 226, 232 as the raster progresses. That is, as the input signal on conductor 273a from the vertical clock (FIG. 9) starts vertical sawtooth generator 223 at the 65th line of the raster trace, it will be apparent from FIG. 1 that the 28 pulses which are generated during the first eight lines of the viewable portion of the raster trace (i.e., lines 65–72) are the widest pulses since the oscillators 226, 232 are running at the starting frequency (i.e., 0.33 MegaHertz). As the raster trace proceeds downwardly, the vertical sawtooth signal input from vertical sawtooth generator 223 over the modulation lead 225 to the voltage controlled oscillators 226, 232 increases in value and changes the frequency rate output from oscillators 226, 232 from 0.33 MegaHertz, for example, in the direction of 2.5 MegaHertz. As a result, pulses output from the decoders in successive line traces of the raster will occur in a correspondingly shorter period of time, and as will be seen with reference to FIG. 1, the resultant time of readout of the 28 bins in successive line traces of the raster will occur in correspondingly shorter periods of time, and will appear on the screen during correspondingly smaller time intervals to provide shorter readout periods and improved resolution at the ranges which are closer to the pilot.

In addition to reducing the time interval of readout for each bin as the raster progresses, it is also necessary to delay the start of the raster trace in each successive line trace so that the matrix will have a sloping format. As explained above, as the raster progresses downwardly, the slope of the vertical sawtooth output from sawtooth generator 220 increases, and the time for the amplitude of the horizontal sawtooth output from generator 224 to reach the amplitude of the vertical sawtooth also increases. Assuming, for exemplary purposes, that the vertical sawtooth output from 220 is at 5 volts at the bottom of the raster, it will require almost three eighths of the raster line trace before the value of the horizontal sawtooth output from 224 reaches the 5 volt value of the vertical sawtooth to enable the voltage comparator 222 to start the oscillator 226. (These voltage values were selected for exemplary purposes only, it being apparent that proportional values of the horizontal and vertical sawtooth rather than 1:1 value of the illustration may be used as well.)

In the initial layout of the circuitry, relative adjustment of these horizontal sawtooths is made so that the 14th pulse output of the first counter 228 occurs at the vertical center line of the raster trace. Since the second oscillator 232 is started up at the vertical center line (i.e., the time the first oscillator is cut off) and is operated at the same frequency by reason of the modulation signal input over conductor 225 to both oscillators 226, 232, the pulse output from the oscillator 232 will terminate at successively earlier times in the successive line traces to provide a sloping matrix format on the right hand side which complements the corresponding left hand margin of the matrix.

We claim:

1. In a display system for presenting a display of information provided by radar equipment comprising input means over which radar video signals representative of a radar transmission along an azimuth heading are received, radar clock means for dividing the radar signals into "$n$" bits, each $n$ bit representing information at a different range on said heading, register means for storing said "$n$" bits including a first and a second shift register for storing information provided in alternate azimuth scans, a plurality of "$m$" video storage registers, each having at least "$n$" storage bins for storing the "$n$" bits of information provided for an azimuth heading, signal processor means for feeding said "$n$" bits for different azimuths alternately from said first and second shift registers to different ones of said video storage registers, different ones of the "$n$" bits for an azimuth being stored in a correspondingly different bin in its register, display means, and readout means for serially gating the "$n$" bits of the corresponding bins in each of the "$m$" video storage registers to said display means.

2. A system as set forth in claim 1 in which said signal processing means include antenna position indicator means having a first output path for providing enabling pulses to said first shift register with said antenna directed along an odd azimuth heading, and a second output path for providing enabling pulses to said second shift register with said antenna directed along an even azimuth.

3. A system as set forth in claim 2 which includes clock selector means in said signal processor means having a first input over which signals are received from said antenna position indicator means and a second input over which signals are received from said radar clock means, and a loading circuit for said first shift register including loading means enabled responsive to the receipt of signals over said first input indicating the antenna is directed along an odd heading and the receipt of pulses from said radar clock means to load the "$n$" bits provided for an odd azimuth by said input means to said first shift register means.

4. A system as set forth in claim 3 in which said clock selector includes a further input circuit over which clock pulses are received at the horizontal rate of the raster, and readout means responsive to said pulses to effect readout of the "$n$" bits in said first shift register to said video storage circuits at the horizontal rate.

5. (Amended) A system as set forth in claim 4 in which said shift register readout means include means for enabling readout of the shift register in a direction opposite to the direction of loading by said loading means.

6. A system as set forth in claim 4 in which said clock selector means includes means for blocking operation of said shift register readout means during the period of enablement of said loading means.

7. A system as set forth in claim 4 in which said loading circuit includes a control circuit which is operative responsive to enablement of said loading means in response to receipt of one pulse of a train of pulses over said second input means and a pulse over said first input means, to enable the loading circuit for a predetermined length of time, and which includes means operative subsequent to each operation of the control circuit to prepare said readout means for operation.

8. A system as set forth in claim 2 in which said antenna position indicator circuit includes circuit means for providing a different output signal for each of the different azimuth positions of said antenna, and in which said first and second output paths are also enabled by said circuit means.

9. A system as set forth in claim 8 which includes input means for providing input signals comprising sine, cosine and reference signals representative of the antenna position, and in which said circuit means includes means for converting said antenna position reference signals to a digital count, a plurality of output paths, each of which represents a different azimuth position, and decoder means for providing a transfer pulse over the one of the output paths which represents the antenna position.

10. A system as set forth in claim 9 in which said circuit means includes pulse generator means for generating at least one additional transfer pulse at the end of the antenna scan in each direction.

11. A system as set forth in claim 2 in which said antenna position indicator circuit has a plurality of output leads, each of which indicates a different sector of azimuth scan of the antenna, and in which said signal processor means includes a different transfer gate means for each video storage means, each transfer gate means having an input connected for enablement by a different one of said output leads, and an output connected to a different one of said video storage registers.

12. A system as set forth in claim 1 in which said signal processing means includes clock means for controlling readout of the shift register during the initial lines of a raster trace.

13. A display system as set forth in claim 1 in which said readout means includes gating means for gating the "$n$" bits of information from said bins in said video storage register at different intervals for different sets of horizontal lines on the raster, and which further includes nonlinear clock means operative at the vertical rate of the raster to select the information in the different bins of the video storage means for gating by said gating means.

14. In a display system for presenting a display of information provided by radar equipment comprising input means over which radar video signals representative of a radar transmission along an azimuth heading are received, radar clock means for dividing the radar signals into "$n$" bits, each "$n$" bit representing information at a different range on said heading, a plurality of "$m$" video storage registers each having at least "n" storage bins for storing the "n" bits of information provided for an azimuth heading, transfer means including gate means for gating said "n" bits which represent information for each different azimuth to a different one of said video storage registers, different ones of the "n" bits for an azimuth being stored in a correspondingly different bin in its register, antenna position indicator means having a plurality of output leads, each of which represents a different antenna position, a pair of input circuits on each gate means and means connecting the input means for each gate to two of said output leads, different gates being connected to different pairs of said output leads, display means, and readout means for selectively gating the "n" bits for a given range from each of the "m" video storage registers to said display means.

15. A system as set forth in claim 14 in which said gate means for a video storage register assigned to store the information for one sector of scan has one input lead connected to one of said output leads on said antenna position indicator circuit which is enabled after the antenna is moved past the one sector.

16. A system as set forth in claim 14 in which said first input of a transfer gate means for the information in an azimuth $b$ is connected to the one of the output leads which is enabled during the scan of azimuth $b-1$ in the movement of the antenna in a left to right scan, and said second input of said transfer gate means is connected to the one of the leads which is enabled during scan of the azimuth $b+1$ in movement of the scan from right to left.

17. In a display system for presenting a display of information provided by radar equipment comprising input means over which radar video signals representative of a radar transmission along an azimuth heading are received, radar clock means for dividing the radar signals into "n" bits, each "n" bit representing information at a different range on said heading, a plurality of "m" video storage registers, each having at least "n" storage bins for storing the "n" bits of information provided for an azimuth heading, signal processing means for feeding said "n" bits which represent information for each different azimuth to a different one of said video storage registers, different ones of the "n" bits for an azimuth being stored in a correspondingly different bin in its video storage register, display means, and horizontal readout means for serially gating the "n" bits of the corresponding bins in each of the "m" video storage registers to said display means, including means for adjusting the period of gating to different values during the raster trace.

18. In a display system for presenting a plan position presentation of information provided by a radar set on the raster of a display device comprising input means over which radar video signals representative of radar transmissions along different azimuths are received, signal conversion means for converting the signals provided at the radar rate into video signals for presentation on said display device including video storage means for storing the signals which represent the different ranges in each azimuth, gating means for gating the information for a selected one of said ranges for each of the different azimuths to said display means in successive increments of a horizontal trace of the raster, different ranges being gated during different horizontal line traces, and horizontal readout means for enabling said gating means for different readout periods in certain horizontal line traces of the raster.

19. A display system as set forth in claim 18 in which said video storage means comprises a plurality of registers, each of which is connected to store the information for one azimuth section of scan, and each of which includes a plurality of bins for storing information related to the different ranges in the azimuth, and in which said horizontal readout means includes pulse generator means for providing a set of readout pulses at a first frequency for effecting readout of the information of a given bin in each register during the initial horizontal line trace, and adjustment means for varying the frequency of said pulse generator means with the vertical trace of the raster.

20. A display system as set forth in claim 19 in which said adjustment means includes means for generating a sawtooth at the output rate of the raster for said pulse generator means.

21. A display system as set forth in claim 18 in which said horizontal readout means includes a first voltage controlled oscillator means adjustable to provide output pulses at different frequencies responsive to input voltages of different values, voltage comparator means for enabling said oscillator means including a first input circuit for providing sawtooth pulses at the horizontal rate of the raster, and a second input circuit for providing sawtooth pulses at the vertical rate of the raster to enable said first voltage oscillator circuit at successively later intervals in successive horizontal line traces of the raster.

22. A system as set forth in claim 21 which includes a second voltage controlled oscillator means adjustable to provide output pulses at different frequencies responsive to input voltages of different values, means for enabling said second voltage controlled oscillator means at the middle of each horizontal line trace on the raster, and which includes frequency adjustment means for simultaneously adjusting the frequency of operation of both of said voltage controlled oscillator means to different values as the raster trace progresses.

23. A system as set forth in claim 22 in which said frequency adjusting means comprises a sawtooth generator operated at the vertical trace of the raster.

24. A system as set forth in claim 18 in which said horizontal readout means comprises a first and a second oscillator circuit operable at different frequencies responsive to different voltage inputs, means for selectively enabling said first oscillator circuit in each horizontal line trace including a voltage comparator circuit, a first sawtooth generator operative at horizontal rate connected to one input of said voltage comparator, a second sawtooth generator operative at the vertical rate of the raster connected to a second input of said voltage comparator, a further vertical sawtooth generator, means connecting the output of said further vertical sawtooth generator to vary the frequency of said oscillator circuits in successive line traces of the raster, counter means for counting a predetermined number of pulses in each horizontal line trace output from said first oscillator circuit, first decoder means responsive to completion of said first predetermined count to enable said second oscillator circuit to provide further pulses in each horizontal line trace, and second decoder means connected to said second oscillator circuit to reset said counters at the end of each line trace, and a plurality of horizontal gates, each of which is connected to gate information from a different one of the video storage means to said display means, and means connecting successive outputs on said first and second decoder means to operate the horizontal gates in sequence.

25. In a display system for presenting a plan position presentation of information provided by a radar set on the raster of a display device, signal conversion means for converting the azimuth and range signals provided at the radar rate into video signals for presentation on said display device, video storage means for storing the video signals which represent the different ranges in each azimuth, horizontal readout means for gating the information for a given range in the successive azimuths from the video storage means to said display means in successive increments of a horizontal trace of the raster, different ranges being gated during different horizontal lines, and vertical clock means for providing a train of nonlinear pulses to vary the period of readout of the video signal information for antenna ranges in a raster trace.

26. In a system as set forth in claim 25 in which said video storage means includes an output path and said vertical clock means are operative to provide a nonlinear clock train to the video storage circuit to feed the stored video signals over said path at the vertical rate of the raster and in which said horizontal readout means are connected to sample the video signals on said path.

27. A system as set forth in claim 26 in which said path is a recirculating path and which includes means for blocking signals over said path responsive to receipt of input signals for said signal conversion means.

28. In a display system for presenting a plan position representation of information on the raster of a display device comprising storage means for storing video signals which are representative of information to be portrayed in a plan pattern comprising a plurality of storage means each having a plurality of storage bins, horizontal gating means for gating the information from a selected one of said bins in each of the different storage means to said display means in successive increments of a horizontal trace of the raster, different bins being gated during different horizontal lines, including means for adjusting the gating time for gating the information from the bins in the storage means to the display means to different values with progression of the raster trace.

29. A system as set forth in claim 28 which includes vertical clock means for providing clock pulses of variable duration during the raster trace to effect readout of the information in certain bins to the gating means for a different number of horizontal lines of the raster.

* * * * *